(No Model.)
A. W. POTTER & T. J. McCONNON.
LESSON TABLET FOR ARITHMETICAL WORK.
No. 331,907. Patented Dec. 8, 1885.
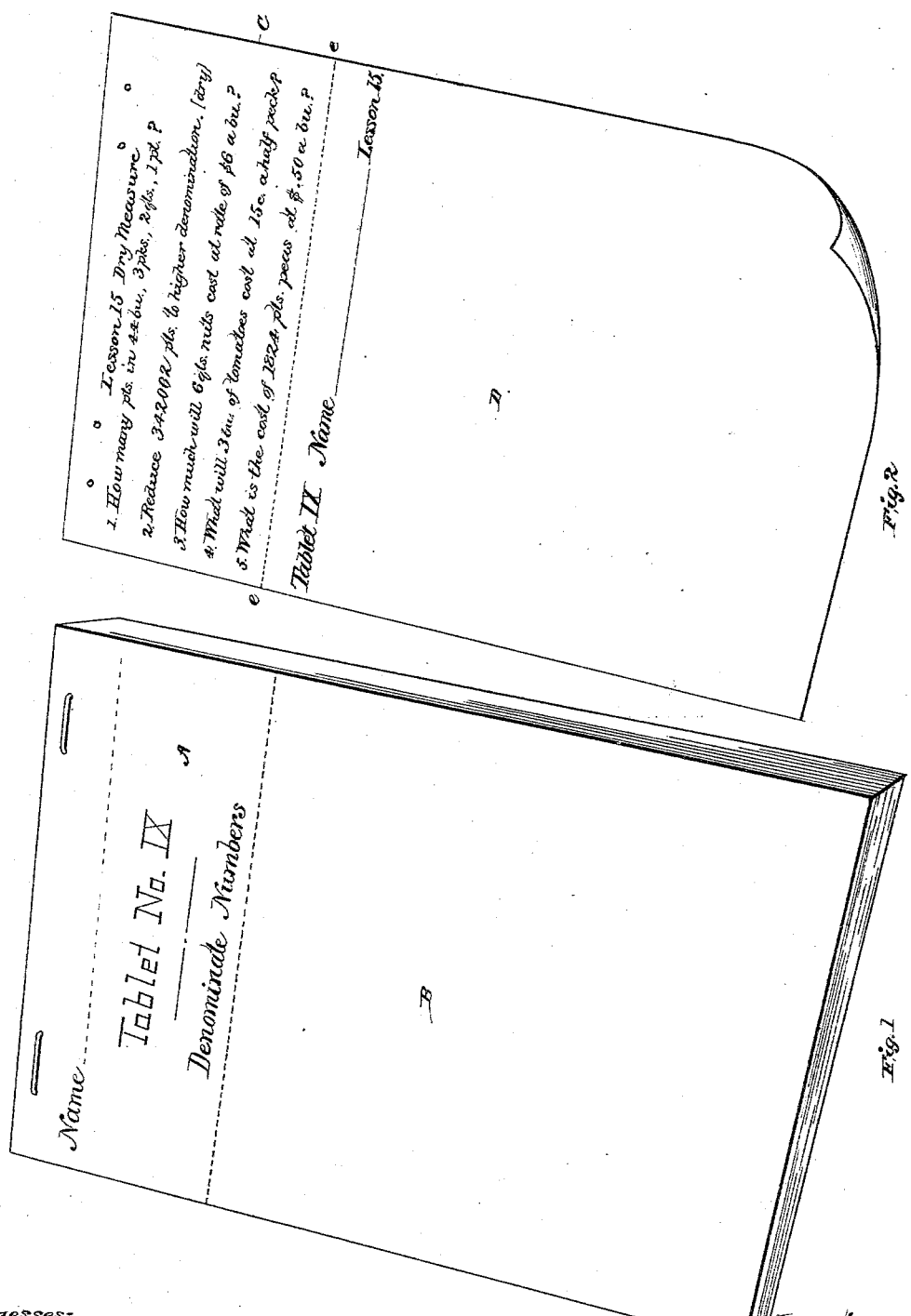

UNITED STATES PATENT OFFICE.

ARTHUR W. POTTER AND THOMAS J. McCONNON, OF WILKES-BARRÉ, PA., ASSIGNORS TO POTTER, AINSWORTH & CO., OF NEW YORK, N. Y.

LESSON-TABLET FOR ARITHMETICAL WORK.

SPECIFICATION forming part of Letters Patent No. 331,907, dated December 8, 1885.

Application filed August 13, 1885. Serial No. 174,339. (No model.)

*To all whom it may concern:*

Be it known that we, ARTHUR W. POTTER and THOMAS J. McCONNON, citizens of the United States, residing at Wilkes-Barré, in the county of Luzerne and State of Pennsylvania, have invented certain new and useful Improvements in Appliances for School Work; and we do hereby declare the following to be a full, clear, and exact description of the invention, such as will enable others skilled in the art to which it appertains to make and use the same.

Our invention consists in providing in a cheap and convenient form a set of lessons or exercises usually taught in schools, together with a corresponding set of blank sheets for the solution of problems or the answers to questions contained in the said lesson or exercises.

The form in which we have embodied our invention is that of a pad or tablet, the sheets of which consist of a set of stubs and removable blanks. The questions or problems are printed on the stubs in successive lessons, beginning at the top with lesson 1 and proceeding with lessons of gradually-increasing difficulty to any desired number. The removable sheets may be blank, though we prefer to have them numbered in the same order as the stubs are numbered, and also to have a blank space for the name of the pupil who does the work. In practice we print the word "Name" at the top of each removable sheet to indicate where the pupil's name should be written, and for further identification of the sheet we number each tablet or set of lessons or exercises and place upon each removable sheet both the number of the tablet or set and the number of the lesson or exercise. Thus the words "Tablet IX, Name ———, Lesson 15" at the top of a sheet indicates that the work upon that sheet is a set of solutions or attempted solutions by a certain pupil of the problems given on the fifteenth stub of the ninth tablet. As all our tablets numbered IX contain the same set of problems or exercises, there will be no danger of confusion should the sheets of different tablets become mixed. The tablet-number is usually printed on some permanent part of the tablet, as upon the back or upon the first leaf of the tablet; but it may be printed on every stub. It will be seen that these tablets furnish means for varying school exercises with less trouble to the teacher than if he were compelled to write out lists of new problems, while the cost is far less than of a similar set of problems in book forms. Moreover, in a book the questions or problems only would be given, while in our tablets blanks are furnished for the solutions and answers. Should the work occupy more space than both sides of a removable sheet, other paper may be used and pinned to the sheet. Extra sheets are bound in at the back of each tablet for this purpose.

The tablet herein shown is provided only with arithmetical problems. It is obvious, however, that any tests or exercises or any problems or questions relating to any branch of school work can be printed in this form with equally great advantage.

In the drawings which accompany and form a part of this specification, Figure 1 represents a perspective of one of our pads or tablets; and Fig. 2 represents one of the inner leaves of the same, comprising a stub and a removable sheet.

In Fig. 1, A is the stub of the first leaf of the tablet, and is provided, as shown, with a blank for the name of a pupil and with the number of the tablet. As this stub remains permanently with the tablet until all the removable sheets are used, it serves always to indicate to whom the tablet belongs, and also, in connection with tablet-numbers on each removable sheet, to indicate to which the solutions and answers on any given sheet apply, should any doubt arise after the sheet has been removed. The stub A is also usually printed with the topic or topics to which the questions or problems of the tablet pertain. The removable sheet B, connected with the stub A, is usually blank, and serves simply to protect the succeeding sheet from soiling before the tablet has been used.

C in Fig. 2 is one of the inner stubs of the tablet, and contains in this instance a number of problems for solution, as well as the number of the lessons. D is one of the inner removable sheets, having at the top the tablet-number and the number of the lesson, together with a blank for a pupil's name. *e e* is an indented or perforated line between the stub and the removable sheet to facilitate the removal of the latter.

Having now described our invention, what we claim, and desire to secure by Letters Patent, is—

1. As an improvement in appliances for school work, a pad or tablet having stubs provided with printed questions, problems, or exercises, and removable blank sheets for the answers or solutions, substantially as described.

2. As an improvement in appliances for school work, a pad or tablet having stubs provided with printed questions, problems, or exercises, and removable sheets for the answers or solutions, the said pad or tablet and each removable sheet having a blank for the pupil's name, substantially as described.

3. As an improvement in appliances for school work, a pad or tablet having a blank for the name of the pupil, and also having stubs provided with printed questions, problems, or exercises, and with different lesson-numbers and removable sheets for the answers or solutions, also provided with different lesson-numbers and with blanks for a pupil's name, substantially as described.

4. As an improvement in appliances for school work, a numbered pad or tablet having a blank for the name of a pupil, and also having stubs provided with printed questions, problems, or exercises, and different lesson-numbers, and removable sheets provided with the tablet-number and with lesson-numbers corresponding to the stubs, and also provided with blanks for a pupil's name, substantially as described.

ARTHUR W. POTTER.
THOMAS J. McCONNON.

Witnesses:
STEPHEN A. POTTER,
FRANKLIN F. AINSWORTH.